United States Patent [19]
Kullmann et al.

[11] Patent Number: 5,619,900
[45] Date of Patent: Apr. 15, 1997

[54] VACUUM BOOSTER ASSEMBLY

[75] Inventors: Bernhard Kullmann, Rochester Hills; Joerg Scheibel, Auburn Hills, both of Mich.

[73] Assignee: ITT Automotive Inc., Auburn Hills, Mich.

[21] Appl. No.: 482,693

[22] Filed: Jun. 7, 1995

[51] Int. Cl.$^6$ .............................. F01B 19/00; F16J 3/00
[52] U.S. Cl. .............................. 92/98 R; 92/128
[58] Field of Search ................... 92/98 R, 98 D, 92/128

[56] References Cited

U.S. PATENT DOCUMENTS

| | | | |
|---|---|---|---|
| 3,109,346 | 11/1963 | Julow | 92/98 D |
| 3,170,380 | 2/1965 | Tate et al. | |
| 3,999,266 | 12/1976 | Parker | 92/98 D X |
| 4,237,775 | 12/1980 | Eisele | 92/99 |
| 4,270,353 | 6/1981 | Thomas et al. | 92/98 D X |
| 4,292,887 | 10/1981 | Ohta et al. | 92/98 D X |
| 4,296,680 | 10/1981 | Ohta et al. | 92/98 D X |
| 4,567,812 | 2/1986 | Weiler et al. | 92/98 D X |
| 4,586,427 | 5/1986 | Thiel | 92/128 X |
| 4,747,336 | 5/1988 | Uyama | 92/98 D X |
| 4,971,523 | 11/1990 | Wacker et al. | |
| 5,067,392 | 11/1991 | Gautier | 92/98 R X |
| 5,163,327 | 11/1992 | Papai | |
| 5,259,292 | 11/1993 | Sunohara et al. | 92/98 R X |

FOREIGN PATENT DOCUMENTS

| | | | |
|---|---|---|---|
| 1396702 | 6/1975 | United Kingdom | 92/98 R |

*Primary Examiner*—John E. Ryznic
*Attorney, Agent, or Firm*—J. Gordon Lewis; Thomas N. Twomey

[57] ABSTRACT

A vacuum booster assembly having first and second walls defining a vacuum chamber and a diaphragm disposed within said vacuum chamber. The diaphragm includes a beaded peripheral portion which is sealingly engaged between the walls and the beaded portion is adhesively secured to at least one of the walls to prevent movement during assembly.

5 Claims, 1 Drawing Sheet

VACUUM BOOSTER ASSEMBLY

TECHNICAL FIELD

This invention relates to vacuum boosters and more particularly relates to vacuum booster assemblies used on vehicle power brake systems.

BACKGROUND OF THE INVENTION

Vacuum booster assemblies are commonly used as a means of assisting a driver during vehicle braking. By using a booster assembly, the force necessary for braking the vehicle is primarily provided by the vacuum booster assembly.

Most vacuum booster assemblies used in vehicle power brake systems utilize atmospheric pressure in generating their assist force. Most commonly, a diaphragm is disposed within a chamber and separates the chamber into first and second components. During a braking operation, one of the chambers is exposed to atmospheric pressure while the other chamber is exposed to a pressure which is less than atmospheric pressure (i.e. a vacuum source). The resulting pressure differential across the diaphragm causes the diaphragm to move thereby moving the associated linkage which assists the vehicle operator in the braking operation.

One common problem associated with diaphragms found in vacuum booster assemblies, is that they are prone to become dislodged during the assembly process. This not only leads to wasted time and money, but also can result in units which are prone to premature failure. More specifically, unless there is a severe misaligned between the diaphragm and its clamping structure, the vacuum booster assembly will function properly for a limited number of cycles, but because of the misalignment, it will prematurely fail (e.g. after ten or more cycles). Thus, simply testing the vacuum booster assemblies at the assembly site is not a completely satisfactory test for ensuring that the diaphragm is properly located and sealed within the chamber.

The problem of misalignment of the diaphragm during assembly is further exacerbated by the fact that most diaphragms used in vacuum booster assemblies tend to be serpentine in design. Thus they are designed having many bends and folds which are susceptible for contacting and causing the diaphragm to be dislodged during assembly of the vacuum booster.

U.S. Pat. Nos. 5,163,327; 4,971,523; 4,237,775; and 3,170,380 all deal with devices which employ diaphragms but none of them deal with the particular problems encountered when assembling vacuum boosters (serpentine diaphragms).

Accordingly, it is an object of this invention to provide a vacuum booster and a method for assembling a vacuum booster which overcomes the misalignment problems associated with serpentine vacuum booster diaphragms.

It is a further object of this invention to provide a vacuum booster assembly which incorporates a means for retaining an internal serpentine diaphragm in place during the assembly process.

SUMMARY OF THE INVENTION

The vacuum booster assembly of the present invention includes first and second booster walls which define a vacuum chamber therebetween. A diaphragm is disposed within the vacuum chamber and the diaphragm preferably includes a beaded peripheral portion and a serpentine portion intermediate its beaded peripheral portion and a central portion. In the vicinity of at least one of the first and second booster walls, the serpentine portion extends generally parallel to one of the walls. The first and second booster walls include bead engaging surfaces for sealingly engaging the diaphragm bead. The diaphragm bead is compressingly disposed between the bead engaging surfaces of the first and second walls. An adhesive is disposed between the beaded portion of the diaphragm and a bead engaging portion of at least one of the first and second booster walls. At least one of the walls is deformed to prevent separation of the booster walls and to maintain the diaphragm bead compressingly disposed between the bead engaging surfaces of the diaphragm walls.

DETAILED DESCRIPTION OF THE PREFERRED EMBODIMENT

Figures 1, 2:
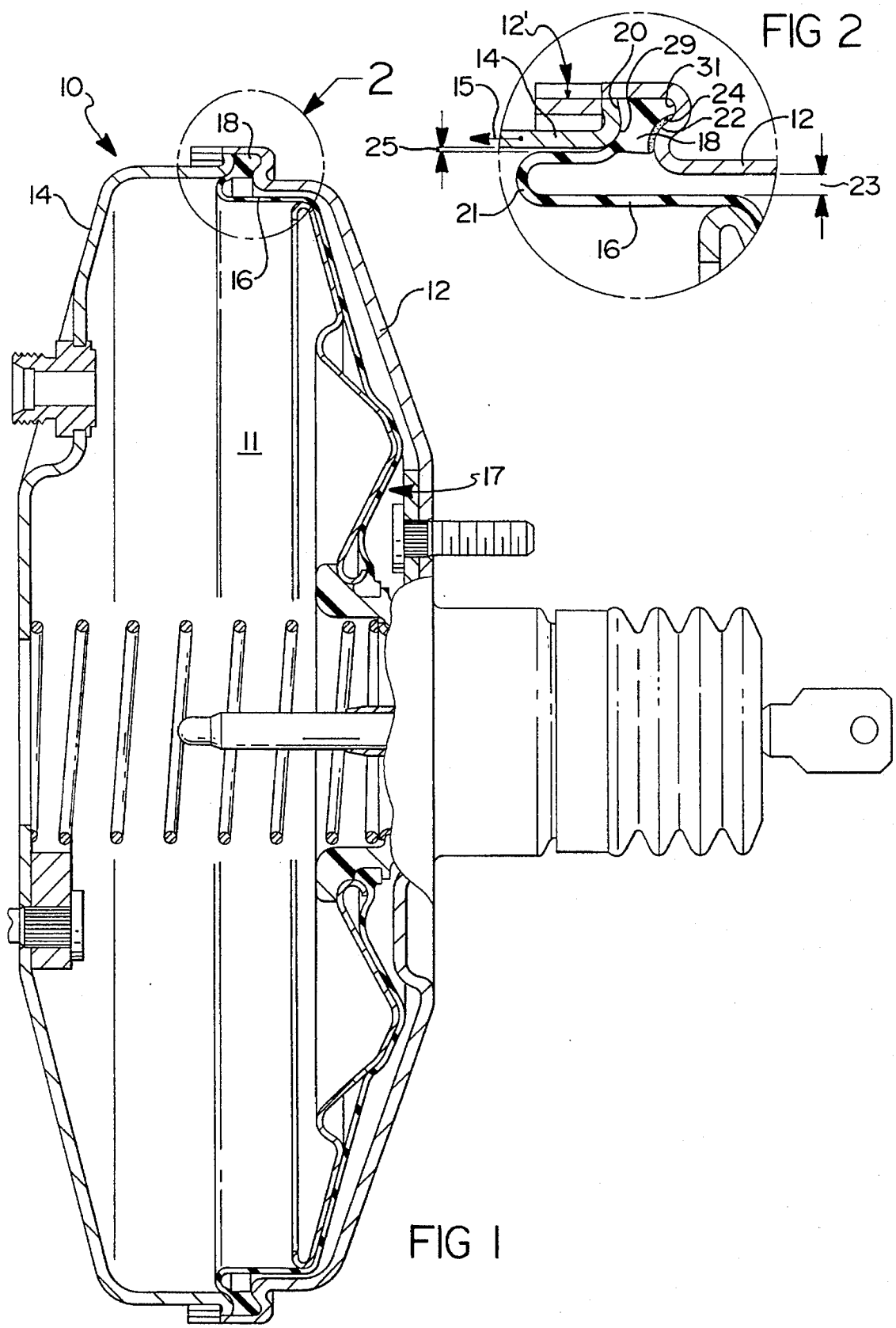
FIG. 1 is a partial cross sectional view showing the vacuum booster assembly of the present invention.
FIG. 2 is an enlarged portion of FIG. 1 showing the sealing relationship between the vacuum booster walls and the serpentine diaphragm.

Now referring to FIG. 1, vacuum booster assembly 10 includes right sidewall (or shell) 12 and left sidewall (or shell) 14. Walls 12, 14 define vacuum chamber 11. Disposed within vacuum chamber 11 is diaphragm 16.

Diaphragm 16 includes a central portion 17, a peripheral beaded portion 18 and a serpentine portion 20 intermediate beaded portion 18 and central portion 17.

Now referring to FIGS. 1 and 2, beaded portion 18 of diaphragm 16 is compressingly disposed between bead engaging surface 20 of wall 14 and bead engaging surface 22 of wall 12. During normal operating conditions forces exerted on wall 14 would urge it to separate from wall 12 in direction 15. In order to prevent separation of walls 12, 14 and in order to compressingly seal bead 18 between bead engaging portions 20, 22, a portion of wall 12 is inwardly deformed 12' thereby interfering with, and preventing, the movement 15 of wall 14.

Adhesive 24 is disposed between bead 18 and at least one bead engaging surface 20, 22.

The process for assembling vacuum booster assembly 10, typically consists of placing beaded portion 18 of diaphragm 16 into engagement with bead engaging surface 22 of wall 12. Thereafter, wall 14 is moved into a position to compress beaded portion 18 between surfaces 20, 22. Because the serpentine geometry of diaphragm 16, the portions of diaphragm 16 proximate walls 12, 14 reside very close 25, 23 to walls 14, 12. Thus, during the assembly process, it is easy for serpentine portions 21 of diaphragm 16 to contact walls 12, 14 thereby dislodging bead 18 from its seating relationship with bead engaging surface 22 of wall 12. In cases of severe dislodgement (or misalignment), the defective booster assembly must be discarded in its entirety inasmuch as these units are not serviceable. This leads to wasted time and money. Additionally, when the misalignment between diaphragm 16 and bead engaging surface 22 is not severe, the assembly 10 may perform satisfactorily for a limited number of cycles but it typically will fail prematurely. This leads to costs associated with warranty repairs and also leads to disgruntled customers.

When adhesive 12 is placed between beaded portion 18 and bead engaging surface 22, it acts to retain beaded portion 18 in positive engagement with bead engaging surface 22 even if diaphragm 16 is contacted by wall 14 during the assembly process. Thus, the use of adhesive 24 reduces misalignments between beaded portion 18 of diaphragm 16 and walls 14, 12 that may otherwise occur during the assembly process.

Preferably, bead 18 includes arcuate engaging surfaces 29, 31 which cooperate with complimentary curvatures in walls 14, 12 respectively to further enhance its resistance to dislodging prior to crimping wall 12 for final assembly.

Although adhesive 24 can be placed in a continuous bead, it is not necessary to do so and placing adhesive 24 at numerous selected locations around the outside periphery of diaphragm 16 will suffice to maintain it in cooperative engagement with surface 22 prior to final assembly. Those skilled in the art are well versed in the types of material used in constructing diaphragms such as diaphragm 16 and no special materials are contemplated separate from those normally used for booster diaphragms. The composition of adhesive 24 is not critical and any adhesive which is compatible with the diaphragm material and the surface treatment of wall 12 will suffice.

The foregoing detailed description shows that the preferred embodiments of the present invention are well suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded protection hereby should be deemed to extend to the subject matter defined in the appended claims including all fair equivalents thereof.

We claim:

1. A vacuum booster assembly, comprising:

first and second booster walls defining a vacuum chamber, a diaphragm disposed within said vacuum chamber, said diaphragm having a peripheral beaded portion and a serpentine portion intermediate its beaded periphery and a central portion, wherein said first and second booster walls include bead engaging surfaces for sealingly engaging said diaphragm bead, wherein said diaphragm bead is compressingly disposed between said bead engaging surfaces of said first and second walls, an adhesive disposed between said beaded portions of said diaphragm and a bead engaging portion of at least one of said booster walls, and means for preventing separation of said booster walls and for maintain the diaphragm bead compressingly disposed between the bead engaging surfaces of the diaphragm walls.

2. The vacuum booster assembly of claim 1, wherein said means for preventing separation includes deforming at least one of said booster walls to prevent separation of said first and second booster walls.

3. The vacuum booster assembly of claim 1, wherein said serpentine portion extends closely proximate to at least one of said first and second booster walls.

4. The vacuum booster assembly of claim 3, wherein said serpentine portion extends generally parallel to at least one of said first and second booster walls.

5. The vacuum booster assembly of claim 1, wherein said peripheral beaded portion of said diaphragm includes an arcuate portion for sealingly engaging said bead engaging surfaces of said first and second walls.

* * * * *